(12) United States Patent
Fukawatase et al.

(10) Patent No.: US 8,596,674 B2
(45) Date of Patent: Dec. 3, 2013

(54) VEHICLE SIDE AIRBAG APPARATUS

(75) Inventors: Osamu Fukawatase, Miyoshi (JP); Takashi Sasaki, Kiyosu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 70 days.

(21) Appl. No.: 13/338,838

(22) Filed: Dec. 28, 2011

(65) Prior Publication Data

US 2012/0187729 A1 Jul. 26, 2012

(30) Foreign Application Priority Data

Jan. 26, 2011 (JP) .................................. 2011-014550

(51) Int. Cl.
*B60R 21/207* (2006.01)

(52) U.S. Cl.
USPC ................. 280/730.2; 280/728.2; 297/216.13

(58) Field of Classification Search
USPC ................ 280/728.2, 729, 730.2; 297/216.13
IPC ..................................................... B60R 21/207
See application file for complete search history.

(56) References Cited

U.S. PATENT DOCUMENTS

| | | | | |
|---|---|---|---|---|
| 4,359,200 A | * | 11/1982 | Brevard et al. | 244/122 AG |
| 5,564,735 A | | 10/1996 | Boy et al. | |
| 5,799,971 A | * | 9/1998 | Asada | 280/730.2 |
| 5,826,938 A | * | 10/1998 | Yanase et al. | 297/216.13 |
| 6,217,061 B1 | * | 4/2001 | Harland et al. | 280/730.2 |
| 6,220,624 B1 | * | 4/2001 | Abraham et al. | 280/728.2 |
| 6,422,590 B1 | * | 7/2002 | Umezawa et al. | 280/728.2 |
| 7,232,150 B2 | * | 6/2007 | Nagayama | 280/730.2 |
| 7,798,519 B2 | * | 9/2010 | Kawabe et al. | 280/728.3 |

FOREIGN PATENT DOCUMENTS

| | | |
|---|---|---|
| JP | U-06-001022 | 1/1994 |
| JP | Y2-2567604 | 4/1998 |
| JP | A-2000-168485 | 6/2000 |
| JP | B2-3805404 | 8/2006 |
| JP | A-2007-6961 | 1/2007 |

\* cited by examiner

*Primary Examiner* — Ruth Ilan
*Assistant Examiner* — Laura Freedman
(74) *Attorney, Agent, or Firm* — Oliff & Berridge, PLC

(57) ABSTRACT

A vehicle side airbag apparatus includes a resin seat frame that includes a recess that is elongated in a vehicle top-bottom direction, and that opens to a vehicle front side; a module casing that is disposed inside the recess and includes an outer side wall and an inner side wall that are arranged in parallel with each other, and extend in the vehicle front-rear direction, the outer side wall being disposed outside the inner side wall in a vehicle width direction, in a horizontal sectional view; and a side airbag stored in a folded manner within the module casing. In at least one of the outer side wall and the inner side wall, a low rigidity portion is provided in an area including an entirety of, or a portion of a region that overlaps with an iliac crest of a seated occupant in a side view.

13 Claims, 5 Drawing Sheets

VEHICLE SIDE AIRBAG APPARATUS

INCORPORATION BY REFERENCE

The disclosure of Japanese Patent Application No. 2011-014550 filed on Jan. 26, 2011 including the specification, drawings and abstract is incorporated herein by reference in its entirety.

BACKGROUND OF THE INVENTION

1. Field of the Invention

The invention relates to a vehicle side airbag apparatus.

2. Description of Related Art

Japanese Patent No. 3805404 describes a structure in which a rear seat side airbag apparatus is provided inside each of seat side portions that are arranged on both sides of a split-folding seatback and are fixed to a vehicle body.

However, in the related art described above, if a seat frame that is disposed inside the seat side portion is made of resin, it is required to prevent the seat frame from breaking or flying in the event of a side collision. It is conceivable to use a metal casing as a casing that accommodates the airbag. However, if the metal casing is used, there is a possibility that a portion of the casing comes into contact with a lumbar region (iliac position) of a seated occupant through a seat frame or a seat pad in the event of the side collision. Therefore, the related art described above leaves room for improvement.

SUMMARY OF THE INVENTION

The invention provides a vehicle side airbag apparatus in which a seat frame is effectively prevented from flying in the event of a side collision when the seat frame is made of resin, and which reduces load input to the lumbar region of a seated occupant.

A vehicle side airbag apparatus according to an aspect of the invention includes: a seat frame that is made of resin and supports a pad disposed inside a side portion of a seatback, wherein the seat frame includes a recess that is elongated in a top-bottom direction of a vehicle, and that opens to a vehicle front side; a module casing that is disposed inside the recess and includes a pair of an outer side wall and an inner side wall, wherein the outer side wall and the inner side wall are arranged in parallel with each other, and extend in a front-rear direction of the vehicle, and the outer side wall is disposed outside the inner side wall in a width direction of the vehicle, in a horizontal sectional view; and a side airbag that is stored in a folded manner within the module casing, wherein when gas produced by an inflator is supplied to the side airbag, the side airbag is deployed along a surface of a side portion of a vehicle body, the surface facing an inside of a vehicle cabin. In at least one of the outer side wall and the inner side wall in the module casing, a low rigidity portion is provided in an area including an entirety of, or a portion of a region that overlaps with an iliac crest of a seated occupant in a side view.

In the vehicle side airbag apparatus according to the aspect described above, the low rigidity portion may be provided in the entirety of, or a portion of the region that overlaps with the iliac crest of the seated occupant in the side view. In addition, the module casing may be made of metal.

According to the aspect described above, the pad that is disposed inside the side portion of the seatback is supported by the seat frame that is made of resin. The seat frame includes the recess that is elongated in the top-bottom direction of the vehicle and opens to the vehicle front side, and the metal module casing is disposed inside the recess. Accordingly, the seat frame is effectively prevented from, for example, flying in the event of the side collision.

If the side portion of the vehicle body enters a vehicle cabin in the event of the side collision, the side wall of the module casing may move close to a lumber region of an occupant. In this case, according to the above aspect of the invention, load input to the lumbar region of the seated occupant is reduced, because the low rigidity portion is provided in the area including the entirety of, or a portion of the region that overlaps with the iliac crest of the seated occupant in the side view, in at least one of the outer side wall and the inner side wall in the module casing.

In the vehicle side airbag apparatus according to the aspect described above, length of the outer side wall in the front-rear direction of the vehicle may be longer than length of the inner side wall in the front-rear direction of the vehicle, and an indentation may be formed in the outer side wall as the low rigidity portion. In the vehicle side airbag apparatus according to the aspect described above, length of the outer side wall in the front-rear direction of the vehicle may be longer than length of the inner side wall in the front-rear direction of the vehicle, and a fragile portion may be provided in the outer side wall as the low rigidity portion.

According to the aspect of the invention, the length, in the vehicle front-rear direction, of the outer side wall disposed on the outer side in the vehicle width direction is longer than the length, in the vehicle front-rear direction, of the inner side wall disposed on the inner side in the vehicle width direction. Therefore, there is a high possibility that the outer side wall moves close to the lumbar region of the seated occupant. However, according to the aspect of the invention, since the indentation or the fragile portion is provided in the outer side wall as the low rigidity portion, if the outer side wall moves close to the lumbar region of the seated occupant, the indentation or the fragile portion becomes adjacent to the lumbar region of the seated occupant.

As described above, the vehicle side airbag apparatus according to the aspect of the invention has excellent advantageous effects of effectively preventing the seat frame from flying in the event of the side collision when the seat frame is made of resin, and reducing load input to the lumbar region of the seated occupant.

The vehicle side airbag apparatus according to the aspect of the invention has the excellent advantageous effect of further reducing the possibility that large load is transferred to the lumbar region of the seated occupant.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
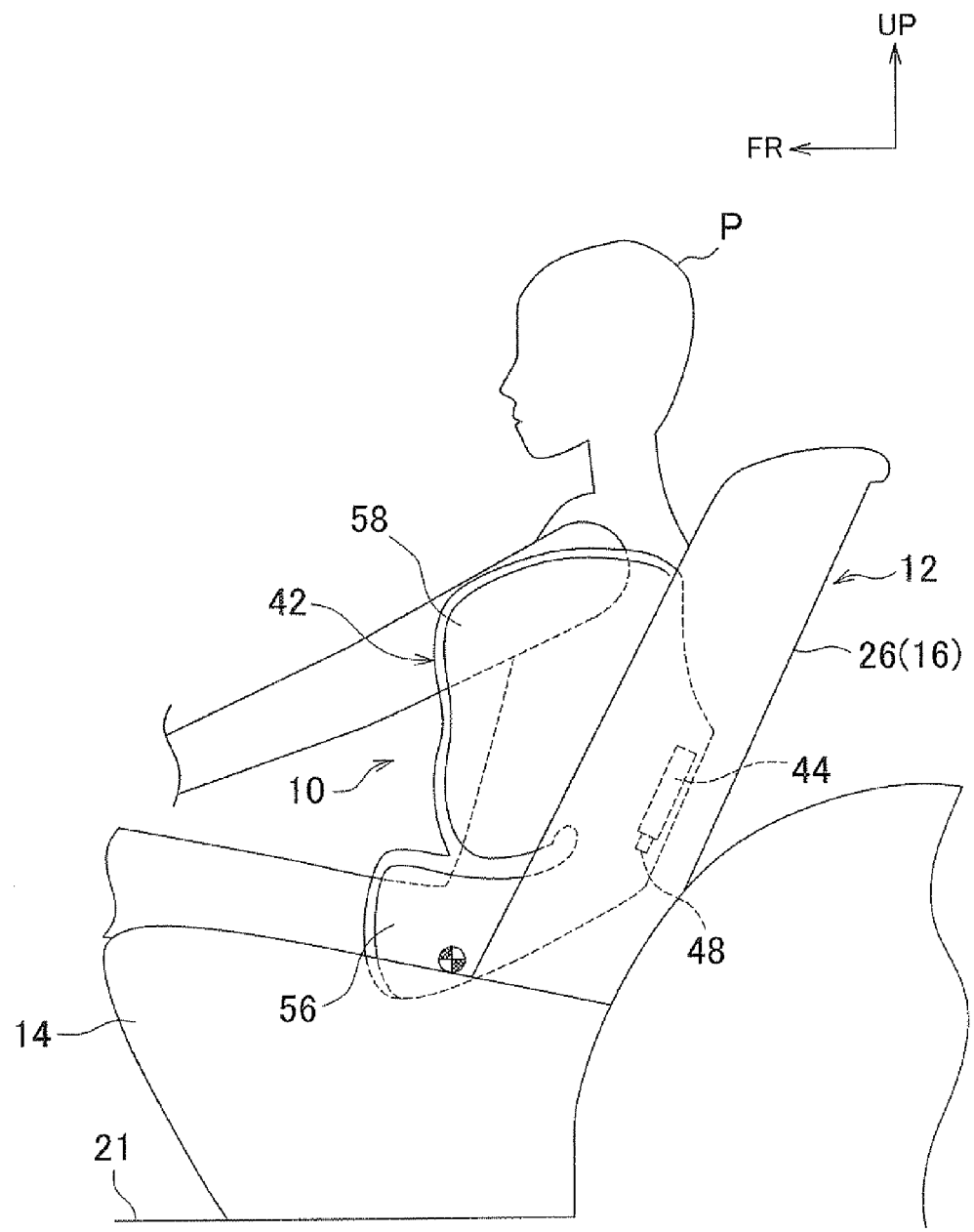
FIG. 1 is a side view that is seen from a vehicle side and shows an operating state of a rear seat side airbag apparatus according to an embodiment of the invention.

Hereinafter, a vehicle side airbag apparatus according to an embodiment of the invention will be described with reference to FIG. 1 through FIG. 5. In the drawings, an arrow FR denotes a vehicle front side, an arrow UP denotes a vehicle upper side, and an arrow IN denotes an inner side in a width direction of a vehicle (vehicle width direction), as appropriate.

Figure 3:
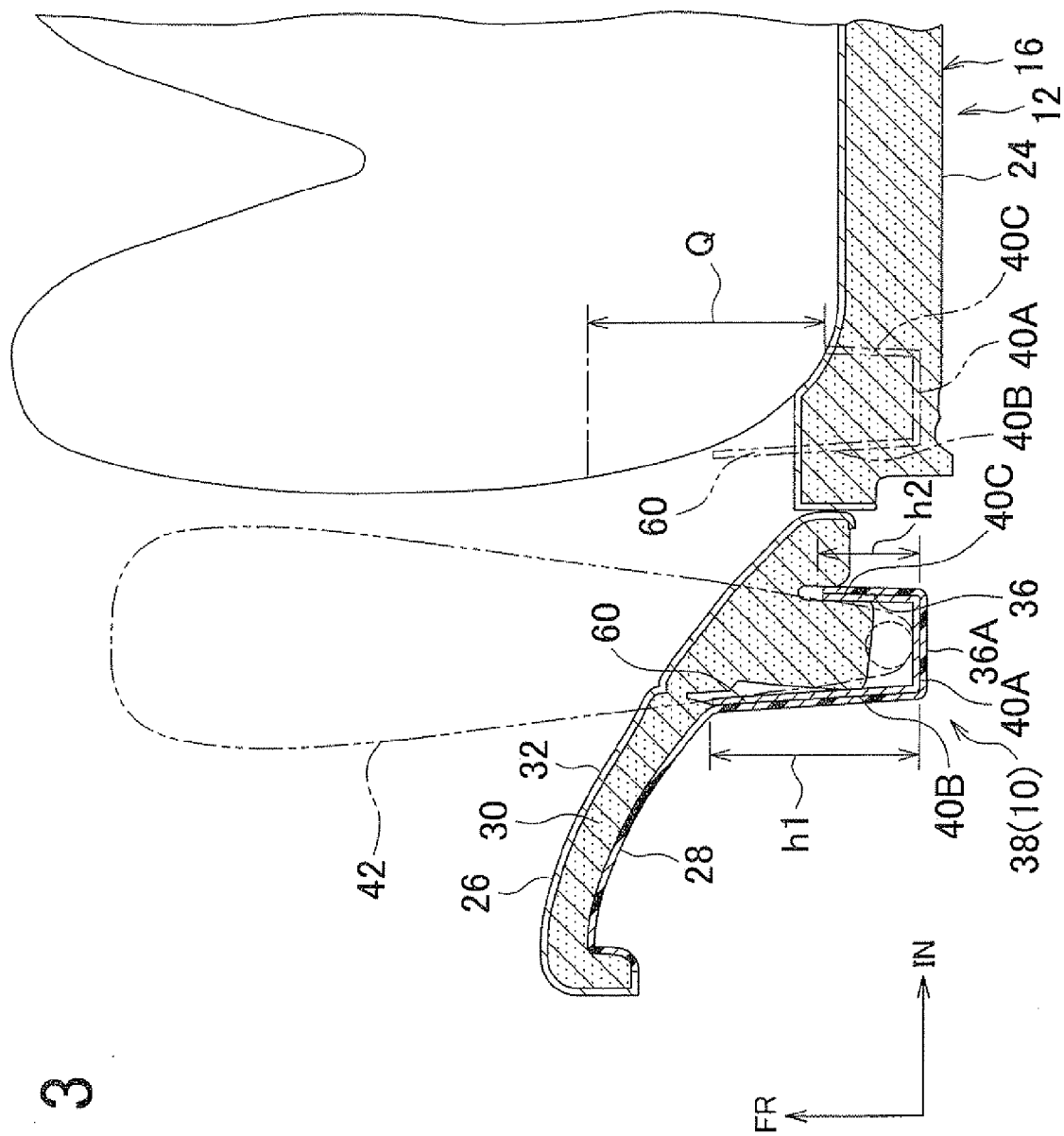
FIG. 3 is a horizontal sectional view that shows the state taken along the line of FIG. 2.

As shown in FIG. 1 and FIG. 3, a rear seat side airbag apparatus 10 as the vehicle side airbag apparatus according to the embodiment is applied to a rear seat 12, and the rear seat 12 includes a rear seat cushion 14 that supports the buttocks and the femoral region of an occupant, and a rear seatback 16 that supports the lumbar region and the back of the occupant. Depending on vehicle models, a head restraint is provided on an upper end of the rear seatback 16.

The rear seatback 16 is a split-folding rear seatback and includes paired right and left main portions 24 that can recline or fold with respect to a rear floor 21, and paired right and left side supports 26. Each of the right and left side supports 26 is disposed on an outer side of the main portion 24 in the vehicle width direction, that is, disposed closer to a door of the vehicle than the main portion 24 is. Here, the side support 26 may be regarded as the "side portion of the seatback" according to the invention.

The paired right and left side supports 26 are respectively fixed to side walls of a vehicle body. Each side support 26 includes a pad 30 that has a substantially curved sectional shape. A surface of the pad 30 is covered by a cover 32. In addition, a resin seat frame 28 is disposed on a reverse side of the pad 30. The seat frame 28 is elongated in a height direction of the seatback (seatback height direction), and its horizontal sectional shape is a substantially U-shape that is open toward the vehicle rear side. The pad 30 is supported by the seat frame 28.

As shown in FIG. 3, the seat frame 28 includes a recess 36 that is dented toward the vehicle rear side, and that has a substantially rectangular parallelepiped shape. The recess 36 extends from a substantially center position to an inner position in the seat frame 28 in the vehicle width direction. An airbag module 38 that constitutes the main portion of the rear seat side airbag apparatus 10 is mounted in the recess 36.

The airbag module 38 includes a metal module casing 40 (see FIG. 2 and FIG. 4) that is mounted inside the recess 36, a side airbag 42 that is stored in a folded manner in the module casing 40, an inflator 44 in a circular cylindrical shape as gas generating means that generates gas inside the side airbag 42 in the event of the side collision, and a diffuser (not shown) as flow regulating means that surrounds the inflator 44.

Figure 2:
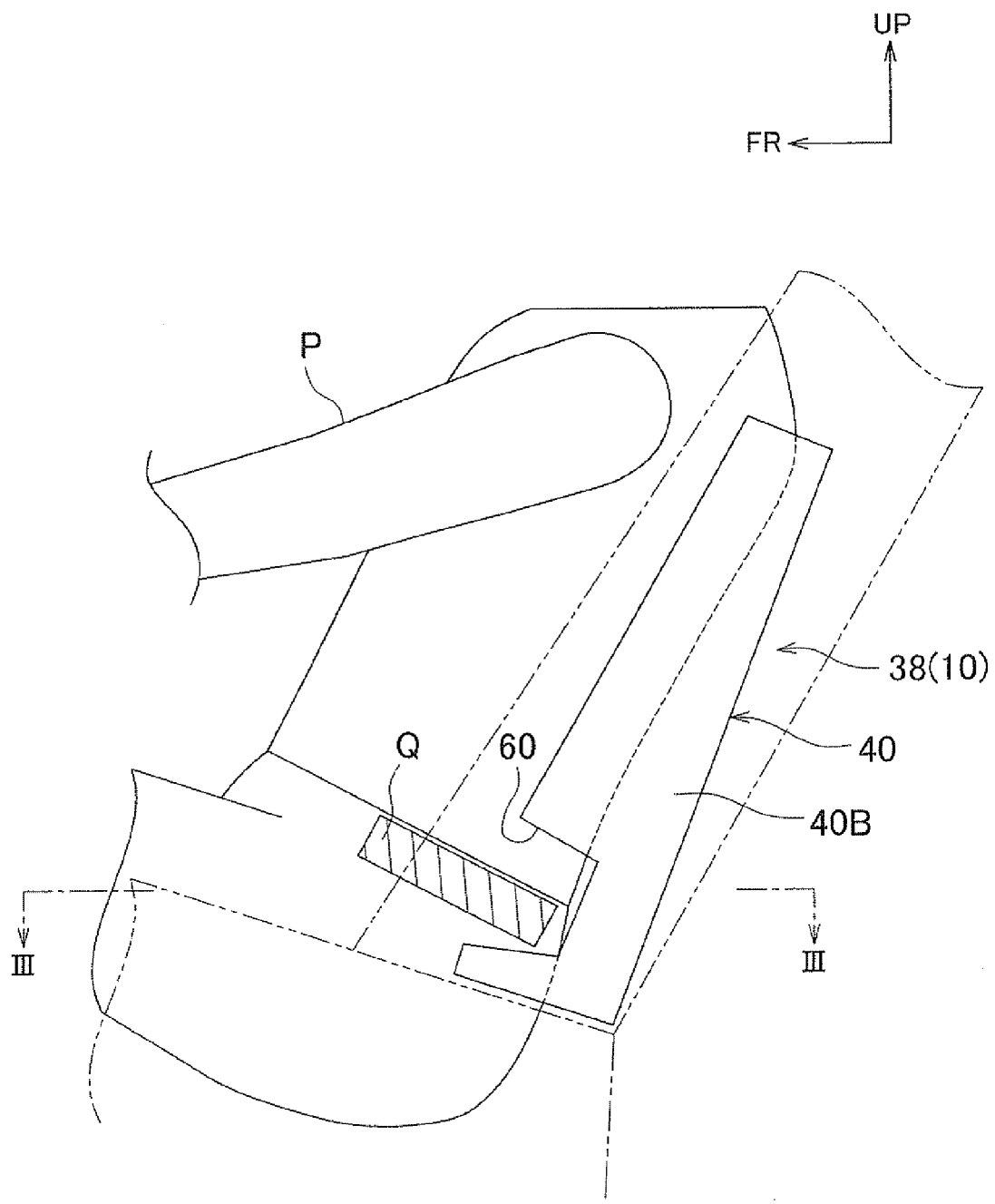
FIG. 2 is an enlarged side view of a main portion, which shows a positional relation between an iliac crest of a seated occupant and a module casing shown in FIG. 1.
Figure 4:
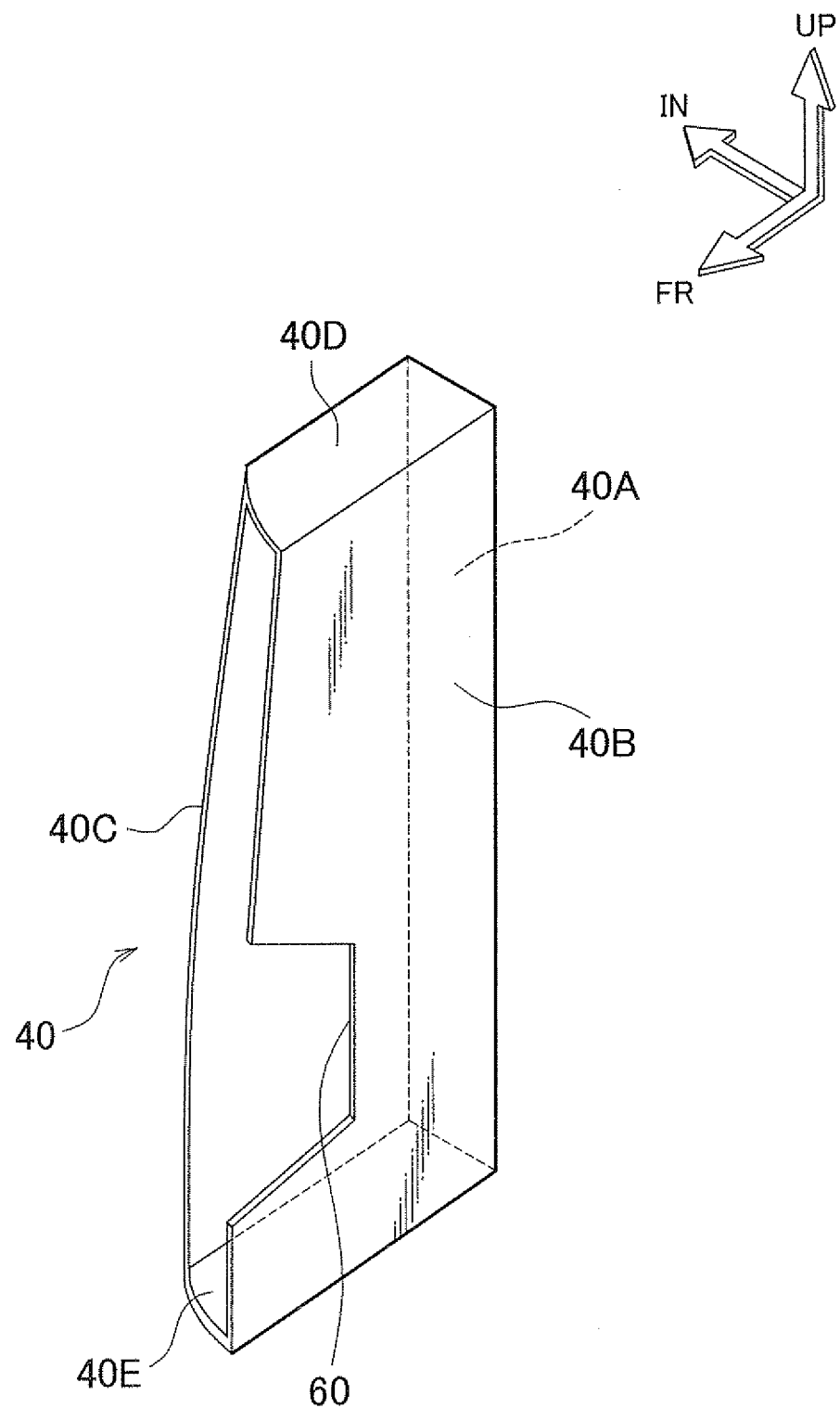
FIG. 4 is a perspective view of the module casing shown in FIG. 2.

As shown in FIG. 2 through FIG. 4, the module casing 40 has a substantially box shape that is elongated in the seatback height direction, and the module casing 40 is disposed in a manner such that an opening portion of the module casing 40 faces toward the vehicle front side. In addition, the module casing 40 includes a bottom wall 40A that is a substantially rectangular flat plate; a pair of an outer side wall 40B and an inner side wall 40C that extend from side portions of the bottom wall 40A in a front-rear direction of the vehicle (vehicle front-rear direction), and that are arranged in substantially parallel with each other; and an upper wall 40D and a lower wall 40E that extend from an upper edge and a lower edge of the bottom wall 40A in substantially parallel with each other. The outer side wall 40B is a side wall that is disposed on the outer side in the vehicle width direction (i.e., the outer side wall 40B is disposed outside the inner side wall 40C in the vehicle width direction), and the inner side wall 40C is a side wall that is disposed on the inner side in the vehicle width direction (i.e., the inner side wall 40C is disposed inside the outer side wall 40B in the vehicle width direction).

The side airbag 42 is folded in a predetermined folding manner (in this embodiment, the side airbag 42 is accordion-folded) and covered with a wrapping material (not shown) so that the shape is maintained. The wrapping material easily breaks when the side airbag 42 is inflated and deployed. In general, the airbag may be rolled-up, or may be accordion-folded. In this embodiment, the side airbag 42 is accordion-folded so that the side airbag 42 is easily unfolded. However, the airbag may be rolled-up, or a portion of the airbag may be rolled-up and a portion of the airbag may be accordion-folded.

On the other hand, referring back to FIG. 1, the inflator 44 and the diffuser are disposed inside the folded side airbag 42. The inflator 44 is arranged such that a longitudinal direction of the inflator 44 is a top-bottom direction of the side support 26 (seatback height direction). A gas injection portion 48 that is provided with a plurality of gas injection holes is formed to protrude at one end (at the lower end) of the inflator 44 in the longitudinal direction. In addition, a squib that is an ignition device, and an igniting agent are disposed at the other end (at the upper end) of the inflator 44 in the longitudinal direction. The squib is electrically connected to an airbag ECU that is disposed, for example, below a console box, and the airbag ECU is electrically connected to a side collision sensor that is disposed in a side portion of the vehicle body. When the side collision sensor detects a side collision of the vehicle, the side collision sensor outputs a detection signal to the airbag ECU. The airbag ECU determines whether the side airbag 42 needs to be actuated or not, and once the airbag ECU determines that the side airbag needs to be actuated, a predetermined current is applied to the squib, and the igniting agent is ignited. Accordingly, the gas is discharged from the plurality of gas injection holes provided in the inflator 44. Instead of the inflator 44 that contains the gas-forming agent, an inflator that contains a high-pressure gas may be used.

The aforementioned inflator 44 is covered by the diffuser (not shown) that functions as the flow regulating means. The diffuser is fixed to the inflator 44 by swaging or the like. The diffuser regulates the flow of the gas that is discharged from the inflator 44 and supplies it into the side airbag 42. Paired upper and lower stud bolts are disposed in the diffuser. The upper stud bolt extends through the side airbag 42, the bottom wall 40A of the module casing 40, and a bottom wall portion 36A of the recess 36 (see FIG. 3), and a distal end of the stud bolt is screwed with a nut. Accordingly, the upper portion of the diffuser is fastened and fixed to the seat frame 28 together with the module casing 40, and the side airbag 42 is interposed between the diffuser and the bottom wall 40A of the module casing 40. An area of the airbag module 38, which is located at a height at which the inflator 44 is disposed, is fastened and fixed to the seat frame 28.

The lower stud bolt that is disposed in the diffuser extends through the side airbag 42 and the bottom wall 40A of the module casing 40, and a distal end of the stud bolt is screwed with a nut. Accordingly, the lower portion of the diffuser is fastened and fixed to the module casing 40, and the side airbag 42 is interposed between the diffuser and the bottom wall 40A of the module casing 40.

As shown in FIG. 1, the side airbag 42 includes in one unit: a lumbar protection bag portion 56 that is deployed between the lumbar region of the seated occupant P and a door trim of a rear side door that is a side portion of the vehicle body; and a chest/shoulder protection bag portion 58 that is deployed between the chest and the shoulder of the seated occupant P and the door trim of the rear side door that is the side portion of the vehicle body. Thus, the side airbag 42 according to the embodiment is configured as a side airbag that is large in a top-bottom direction of the vehicle (vehicle top-bottom direction).

As shown in FIG. 3 and FIG. 4, in the aforementioned module casing 40, the length, in the vehicle front-rear direction, of the outer side wall 40B disposed on the outer side in the vehicle width direction is longer than the length, in the vehicle front-rear direction, of the inner side wall 40C disposed on the inner side in the vehicle width direction. That is, as shown in FIG. 3, dimensions of the side walls are set such that the length h1 of the outer side wall 40B is longer than the length h2 of the inner side wall 40C (h1>h2).

In addition, as shown in FIG. 2, in the outer side wall 40B, an indentation 60 is formed as a low rigidity portion in an area including a region that overlaps with an iliac crest Q of the seated occupant P in a side view. By forming the indentation 60, the rigidity of this area of the outer side wall 40B is lower than the rigidity of the rest of the outer side wall 40B. In consideration of differences in physical constitutions of seated occupants P, the width of the indentation 60 in the vehicle top-bottom direction is wider than the width of the iliac crest Q in the vehicle top-bottom direction. In this embodiment, in the outer side wall 40B, the indentation 60 is formed in the area including the entirety of the region that overlaps with the iliac crest Q of the seated occupant P in the side view (precisely, the indentation 60 is formed in the area that is wider in the seatback height direction than the entire region that overlaps with the iliac crest Q in the side view). However, the invention is not limited to the above configuration. The indentation may be formed in the entirety of the region that overlaps with the iliac crest Q in the side view, the indentation may be formed in an area including a portion of the region that overlaps with the iliac crest Q in the side view, or the indentation may be formed in a portion of the region that overlaps with the iliac crest Q in the side view. In these cases as well, the effect of reducing the rigidity is obtained in accordance with the area (region) in which the indentation is formed.

Next, functions and effects of the embodiment will be described. The rear seat side airbag apparatus 10 according to the embodiment detects a vehicle side collision using the side collision sensor (not shown) that is disposed on the side portion of the vehicle body such as a center pillar or a rear pillar, in the event of the vehicle side collision. The detection signal is output from the side collision sensor to the airbag ECU, and the airbag ECU determines that the rear seat side airbag apparatus 10 needs to be actuated. Therefore, the airbag ECU actuates the inflator 44. That is, the predetermined current is applied to the squib of the inflator 44. Accordingly, the inflator 44 produces a large amount of gas to inflate the side airbag 42 that is stored in a folded manner within the module casing 40. Thus, the cover 32 breaks along a specified burst line, and an opening is formed in a front portion of the side support 26. As a result, as shown in FIG. 1 and FIG. 3, the side airbag 42 is inflated and deployed between the side portion of the upper body of the seated occupant P and the door trim of the rear side door. More specifically, the lumbar protection bag portion 56 is deployed between the lumbar region of the seated occupant P and the door trim. The chest/shoulder protection bag portion 58 is also deployed between the chest and the shoulder of the seated occupant P and the door trim. As a result, the occupant is protected against an impact by the side airbag 42 in the event of the side collision. In other words, the side airbag 42 is deployed along a surface of the side portion of the vehicle body, the surface facing the inside of a vehicle cabin.

In the embodiment, the pad 30 that is disposed inside the side support 26 is supported by the resin seat frame 28. The seat frame 28 includes the recess 36 that is elongated in the vehicle top-bottom direction, and that opens to the vehicle front side. The metal module casing 40 is disposed inside the recess 36. Accordingly, the seat frame 28 is effectively prevented from, for example, flying in the event of the side collision.

If the side portion of the vehicle body enters the vehicle cabin in the event of the side collision, the module casing 40 moves close to the seated occupant P due to the entry of the side portion of the vehicle body as shown by two-dot chain lines in FIG. 3. In this case, since the length of the outer side wall 40B in the vehicle front-rear direction is longer than the length of the inner side wall 40C in the vehicle front-rear direction in the module casing 40 according to the embodiment, the front portion of the outer side wall 40B may be adjacent to the lumbar region of the seated occupant P. However, even in that case, since the outer side wall 40B has the indentation 60 that is formed in the area including the region that overlaps with the iliac crest Q of the seated occupant P in the side view, load input to the lumbar region of the seated occupant P is reduced.

According to the rear seat side airbag apparatus 10 according to the embodiment as described above, when the seat frame 28 is made of resin, the seat frame 28 is effectively prevented from, for example, flying in the event of the side collision, and load input to the lumbar region of the seated occupant P is reduced.

Specifically, as in the embodiment, the length, in the vehicle front-rear direction, of the outer side wall 40B disposed on the outer side in the vehicle width direction is longer than the length, in the vehicle front-Tear direction, of the inner side wall 40C disposed on the inner side in the vehicle width direction (h1>h2). Therefore, there is a high possibility that the outer side wall 40B moves close to the lumbar region of the seated occupant. However, according to the embodiment, since the indentation 60 is formed in the outer side wall 40B, if the outer side wall 40B moves close to the lumbar region of the seated occupant P, the indentation 60 becomes adjacent to the lumbar region of the seated occupant P. As a result, it is possible to further reduce the possibility that large load is transferred to the lumbar region of the seated occupant P.

Supplemental Description of the Embodiment (1) In the embodiment described above, the vehicle side airbag apparatus according to the invention is applied to the rear seat side airbag apparatus 10. However, the invention is not limited to the rear seat side airbag apparatus, and the invention may be applied to a front seat side airbag apparatus.

(2) In the embodiment described above, the configuration in which the side airbag 42 includes the lumbar protection bag portion 56 and the chest/shoulder support bag portion 58 has been described as an example. However, the invention is not limited to this configuration, and the invention may be applied to any of side airbags with other configurations for protection.

(3) In the embodiment described above, the indentation 60 is formed only in the outer side wall 40B, and the indentation 60 is not formed in the inner side wall 40C. However, the invention is not limited to this configuration, and the low rigidity portion may be provided only in the inner side wall, or the low rigidity portions may be provided in both of the outer side wall and the inner side wall. In other words, if the side wall that is pushed by the side portion of the vehicle body to move close to the iliac crest Q of the seated occupant P in the event of the side collision is the inner side wall, then the low rigidity portion needs to be formed in the inner side wall, and if both of the outer side wall and the inner side wall move close to the iliac crest Q, then the low rigidity portions need to be formed in both of the outer side wall and the inner side wall.

(4) The description in (4) relates to the description in above (3). In the embodiment, the length h1 of the outer side wall 40B is longer than the length h2 of the inner side wall 40C. However, the invention is not limited to this configuration, and the invention may include the structure in which the length of the inner side wall in the vehicle front-rear direction is longer than the length of the outer side wall in the vehicle front-rear direction, and the structure in which the lengths of both side walls in the vehicle front-rear direction are identical with each other.

Figure 5:
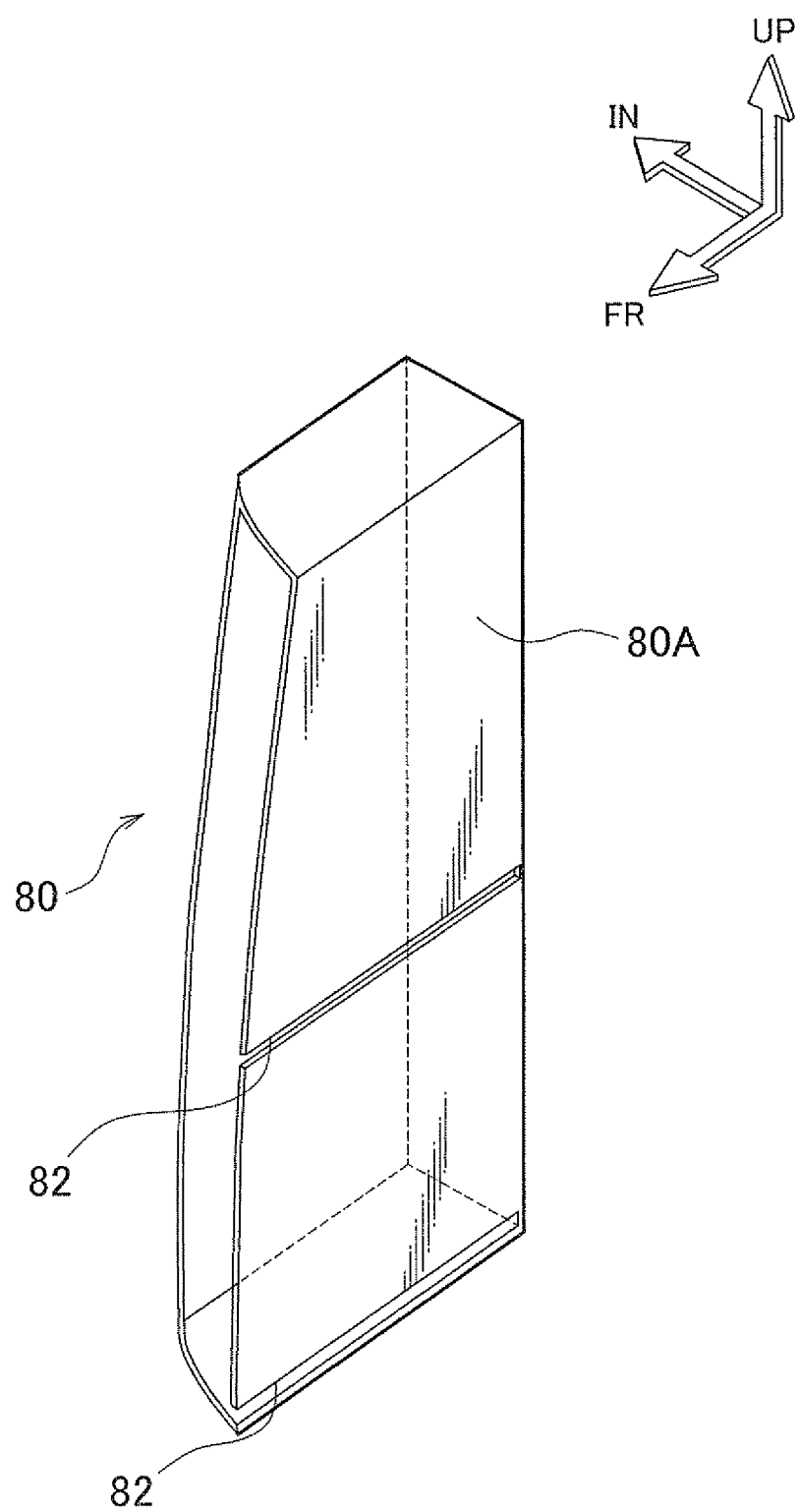
FIG. 5 is a perspective view that shows a modified example of the module casing and corresponds to FIG. 4.

(5) In the embodiment described above, the indentation 60 is formed in the outer side wall 40B as the low rigidity portion. However, the invention is not limited to this configuration, and other configurations may be employed. For example, as shown in FIG. 5, fragile portions 82 that are slits extending in the vehicle front-rear direction may be formed respectively in two portions, that is, a lower end portion and a substantially middle portion in an outer side wall 80A of a module casing 80 in the seatback height direction. By forming these fragile portions 82, the rigidity of the lower portion of the outer side wall 80A is reduced.

What is claimed is:

1. A vehicle side airbag apparatus comprising:
   a seat frame that is made of resin and supports a pad disposed inside a side portion of a seatback, wherein the seat frame includes a recess that is elongated in a top-bottom direction of a vehicle, and that opens to a vehicle front side;
   a module casing that is disposed inside the recess and includes an outer side wall and an inner side wall, wherein the outer side wall and the inner side wall are arranged in parallel with each other, and extend in a front-rear direction of the vehicle, and the outer side wall is disposed outside the inner side wall in a width direction of the vehicle, in a horizontal sectional view; and
   a side airbag that is stored in a folded manner within the module casing, wherein when gas produced by an inflator is supplied to the side airbag, the side airbag is deployed along a surface of a side portion of a vehicle body, the surface facing an inside of a vehicle cabin,
   wherein
   at least one of the outer side wall and the inner side wall includes a low rigidity portion configured to be provided in an area including at least a portion of a region overlapping with an iliac crest of a seated occupant in a side view.

2. The vehicle side airbag apparatus according to claim 1, wherein
   the low rigidity portion is configured to be provided in an entirety of the region overlapping with the iliac crest of the seated occupant in the side view.

3. The vehicle side airbag apparatus according to claim 1, wherein
   the low rigidity portion is an indentation.

4. The vehicle side airbag apparatus according to claim 3, wherein
   the indentation is configured to have a width in the top-bottom direction of the vehicle that is wider than a width of the iliac crest of the seated occupant in the top-bottom direction of the vehicle.

5. The vehicle side airbag apparatus according to claim 1, wherein
   the low rigidity portion is a fragile portion.

6. The vehicle side airbag apparatus according to claim 5, wherein
   the fragile portion is a slit that extends in the front-rear direction of the vehicle.

7. The vehicle side airbag apparatus according to claim 6, wherein
   in at least one of the outer side wall and the inner side wall, the slit is formed in each of a lower end portion and a middle portion in a height direction of the seatback.

8. The vehicle side airbag apparatus according to claim 1, wherein
   a length of the outer side wall in the front-rear direction of the vehicle is longer than a length of the inner side wall in the front-rear direction of the vehicle, and an indentation is formed in the outer side wall as the low rigidity portion.

9. The vehicle side airbag apparatus according to claim 8, wherein
   the indentation is configured to have a width in the top-bottom direction of the vehicle that is wider than a width of the iliac crest of the seated occupant in the top-bottom direction of the vehicle.

10. The vehicle side airbag apparatus according to claim 1, wherein
    a length of the outer side wall in the front-rear direction of the vehicle is longer than a length of the inner side wall in the front-rear direction of the vehicle, and a fragile portion is provided in the outer side wall as the low rigidity portion.

11. The vehicle side airbag apparatus according to claim 10, wherein
    the fragile portion is a slit that extends in the front-rear direction of the vehicle.

12. The vehicle side airbag apparatus according to claim 11, wherein
    in at least one of the outer side wall and the inner side wall, the slit is formed in each of a lower end portion and a middle portion in a height direction of the seatback.

13. The vehicle side airbag apparatus according to claim 1, wherein
    the module casing is made of metal.

* * * * *